April 21, 1959     O. K. HOBBS     2,882,982
CULTIVATOR FOR PEANUTS AND THE LIKE
Filed June 20, 1957     3 Sheets-Sheet 1
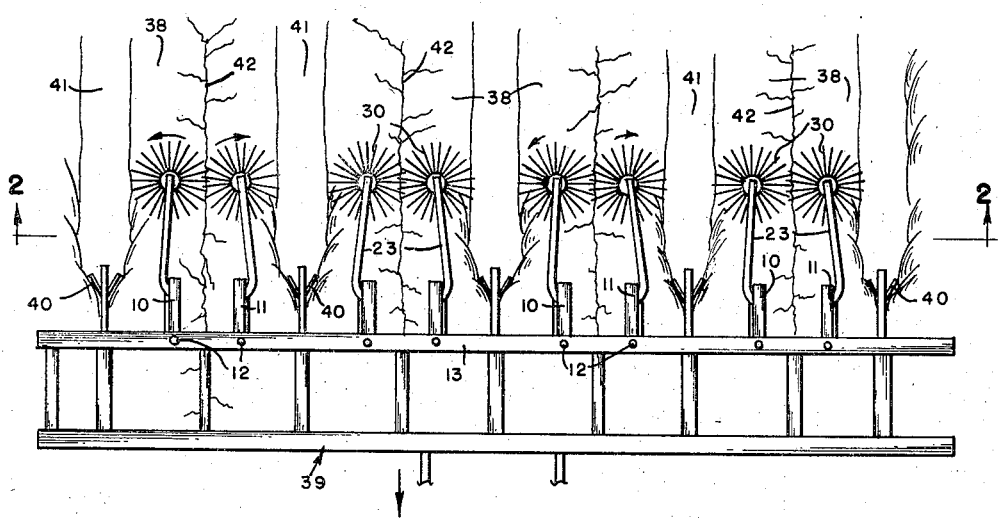
Fig. 1
Fig. 2
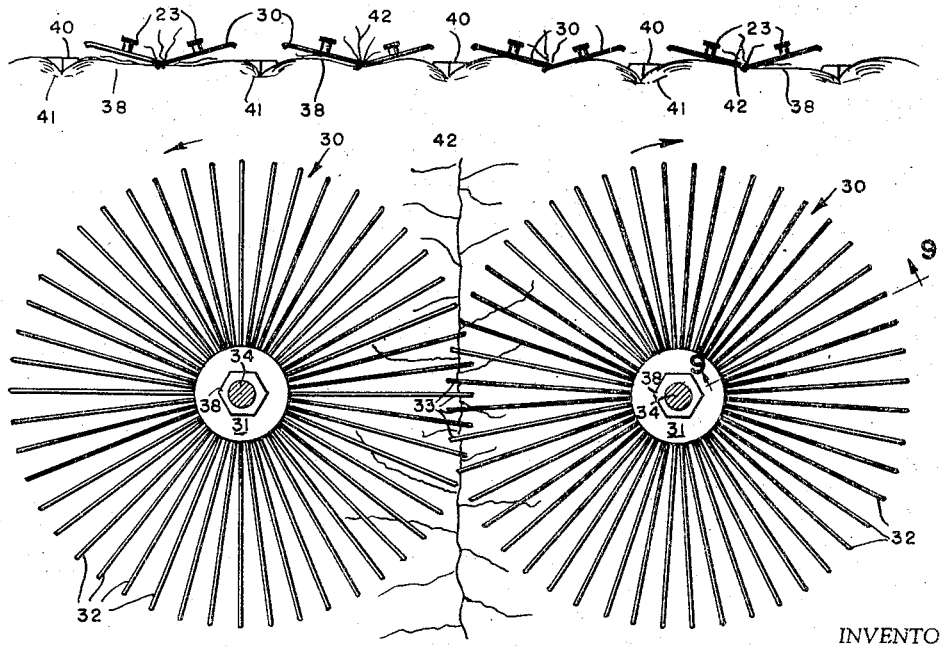
Fig. 3
INVENTOR
OLIVER K. HOBBS
BY B. P. Fishburne, Jr.
ATTORNEY April 21, 1959        O. K. HOBBS        2,882,982
CULTIVATOR FOR PEANUTS AND THE LIKE
Filed June 20, 1957        3 Sheets-Sheet 2
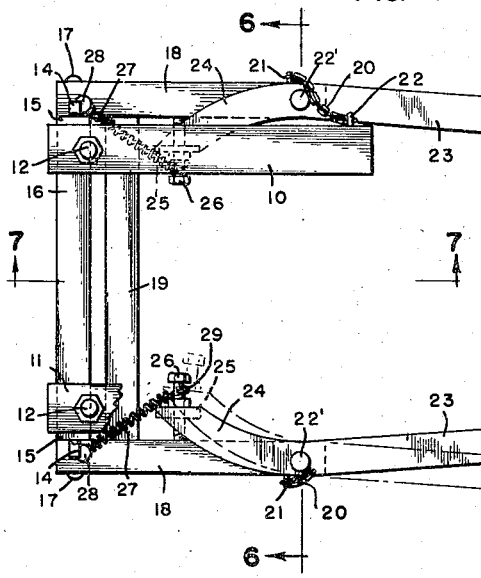
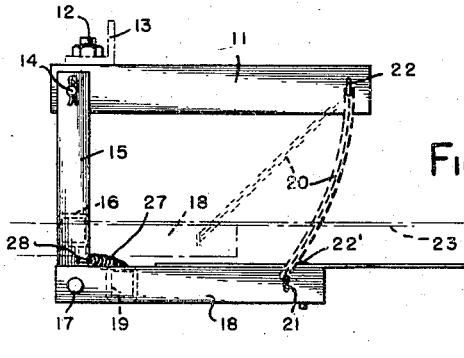
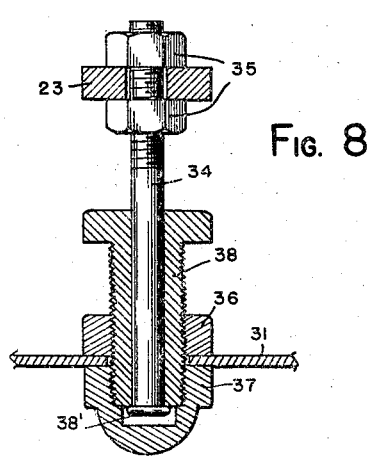
INVENTOR
OLIVER K. HOBBS
BY B. P. Fishburne, Jr.
ATTORNEY April 21, 1959     O. K. HOBBS     2,882,982
CULTIVATOR FOR PEANUTS AND THE LIKE
Filed June 20, 1957     3 Sheets-Sheet 3

INVENTOR
OLIVER K. HOBBS

BY B. P. Fishburne, Jr.

ATTORNEY

United States Patent Office 2,882,982
Patented Apr. 21, 1959

2,882,982

CULTIVATOR FOR PEANUTS AND THE LIKE

Oliver K. Hobbs, Suffolk, Va.

Application June 20, 1957, Serial No. 666,825

4 Claims. (Cl. 172—522)

The invention relates to cultivators.

A primary object of the invention is to provide a cultivator device ideally suited for cultivating peanuts and similar vine-type crops, and also useful in connection with various other crops, such as cotton, corn, soybeans, sweet potatoes, cantaloupes and nursery stock.

A further and more specific object is to provide a cultivator unit embodying rotary intermeshing resilient finger devices which afford a brushing or spreading action upon the tops of the plant hills, for maintaining the same level and removing lumps from the soil and freeing the peanut vines or the like from excessive soil coverage.

A further object is to provide cultivator means of the above-mentioned character including interfitting circular groups of resilient finger-like elements which may engage the plants directly with a brushing vibratory action, without injuring the plants or digging in to the main stalks of plants such as peanut vines.

A further object is to provide cultivator means to be used in conjunction with a conventional row crop cultivator having plow shares, said means serving to spread and level off the soil on the plant hills between the furrows, somewhat in the manner of a pair of human hands, thus preventing peanuts and the like from being smothered by too much soil being thrown over them by the plowshares.

A further important object is to provide cultivator means of the above-mentioned character which is self-operating while in contact with the ground, and including mounting or supporting means which allows the individual rotating elements of the cultivator to spread apart upon contact with any large obstruction, thus preventing damage to the cultivator fingers or damage to a large plant stalk or the like.

A further object is to provide a cultivator of the above-mentioned character having novel self-adjusting mounting means which allows the cultivator to rise and fall with ground irregularities and tending to automatically lift the cultivator upon backward movement of the same so that the resilient cultivator fingers will not dig into the soil while moving in the backward direction.

A still further and general object of the invention is to provide a cultivator device which satisfies a definite need in the farm equipment field, heretofore unsatisfied, the device greatly increasing, for example, the peanut yield per acre by preserving the center or jumbo peanuts, quite generally lost by smothering with an excessive amount of soil thrown up by the cultivator.

Other objects and advantages of the invention will be apparent during the course of the following description.

In the accompanying drawings, forming a part of this application, and in which like numerals are employed to designate like parts throughout the same.

Figure 1 is a plan view, partly diagrammatic showing sets or units of the cultivator device connected with a cultivator frame and illustrating the use of the same for cultivating peanuts or the like.

Figure 2 is a vertical sectional view, partly diagrammatic, taken substantially on line 2—2 of Figure 1.

Figure 3 is an enlarged plan view of a companion pair of the rotary finger implements embodied in a cultivator unit, parts in section.

Figure 4 is a plan view of one complete cultivator unit, partly broken away.

Figure 5 is a side elevation of the cultivator unit.

Figure 8 is an enlarged vertical section taken on line 8—8 of Figure 4.

Figure 6:
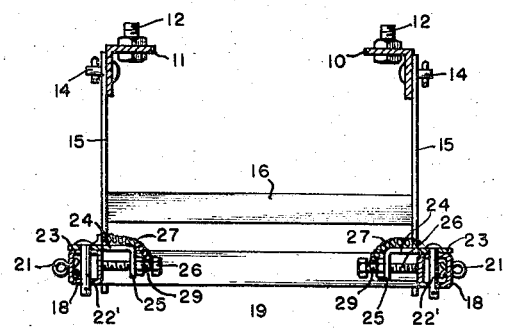
Figure 6 is a transverse vertical section taken on line 6—6 of Figure 4.
Figure 7:
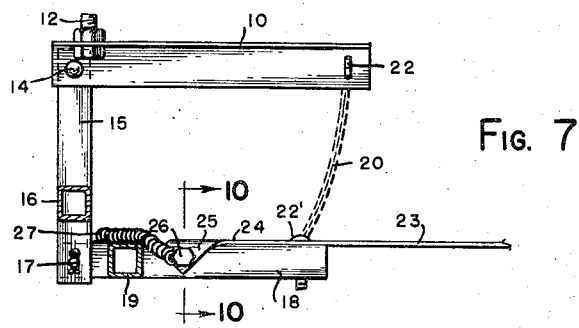
Figure 7 is an enlarged vertical section taken on line 7—7 of Figure 4.
Figure 9:
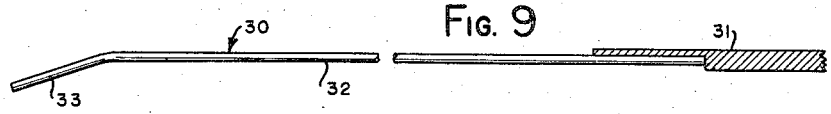
Figure 9 is an enlarged radial section taken on line 9—9 of Figure 3.
Figure 10:
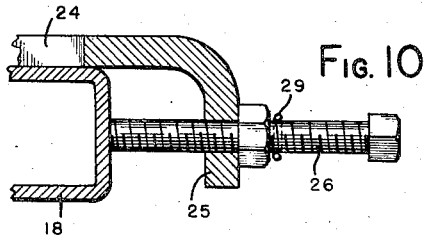
Figure 10 is an enlarged fragmentary vertical section taken on line 10—10 of Figure 7.
Figure 11:
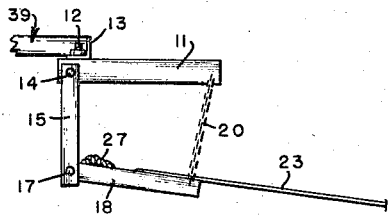
Figure 11 is a side elevation on a reduced scale of the cultivator in a raised position for transportation, parts broken away.

In the drawings, wherein for the purpose of illustration is shown a preferred embodiment of the invention, attention is directed first to Figures 4 through 11, wherein the construction of a single complete cultivator unit is illustrated. In these figures, the numerals 10 and 11 designate relatively short horizontal supporting angle bars, or the like, and these bars bodily carry the remaining elements of the cultivator unit when the same is mounted upon a plow or cultivator, as will be further described. The forward ends of the bars 10 and 11 are provided with suitable bolt means 12, for rigidly securing the bars to the bottom of a rear transverse horizontal frame member 13 of a plow type cultivator, as generally shown in Figure 1.

Dependingly pivoted to the horizontal support bars 10 and 11 near their forward ends, as at 14, is a pair of vertically swingable frame members or links 15, preferably rigidly connected intermediate their ends by a transverse horizontal brace bar 16, rigidly secured thereto, as shown. The links 15 are adjacent the outer sides of the support bars 10 and 11.

Pivoted to the lower ends of the links 15, at 17, is a pair of rearwardly extending vertically swingable arms 18, preferably rigidly connected near their forward ends by a transverse horizontal brace bar 19. The arms 18 are slightly shorter than the support arms 10 and 11, and are preferably made from box sections or tubular stock, as shown. The rear end portions of the arms 18 and support bars 10 and 11 are interconnected by flexible elements or chains 20 having their opposite ends secured as at 21 and 22 to the arms 18 and support bars 10 and 11 respectively. The arrangement is such that the chains permit vertical swinging movement of the arms 18 relative to the support bars 10 and 11 when the cultivator unit rolls over irregularities in the ground, as will be further described. The chains 20 form with the bars 10 and 11, arms 18 and links 15 a parallelogram type of linkage, as best shown in Figure 5. Whenever the links 15 swing forwardly, Figure 5, as when the towing tractor is backing up and the cultivator unit is engaging the ground, the chains 20 will become diagonal and taut and will lift the arms 18 for raising the rotary finger implements clear of the ground, so that they cannot dig into the soil or become damaged as the cultivator backs up.

Pivoted to the arms 18 near their rear ends at 22' for horizontal swinging movement are substantially horizontal implement arms 23 of considerable length. The implement arms 23 include curved forwardly converging extensions 24, integral therewith, forwardly of the pivots 22'. Rearwardly of the pivots 22', the elongated straight portions of the arms 23 converge slightly, Figure 4, when in their normal operating positions. The forward ends of the arm extensions 24 carry depending vertical apertured lugs 25, integral therewith, and these lugs have horizontal transverse adjusting screws 26 mounted thereon and having screw-threaded engagement therewith. The forward ends of the adjusting screws 26 bear against the inner sides of the arms 18, Figure 4, for adjustably limiting the horizontal swinging movement of the implement arms 23 toward each other at their rear ends. Retractile coil springs 27 have corresponding ends secured at 28 to the tops of the arms 18 near the forward ends of such arms, and the rear ends of the springs may be secured to the adjusting screws 26, as shown at 29, whereby the springs resiliently urge the rear ends of the implement arms 23 toward each other at all times. The curved extensions 24 are much shorter than the straight portions of the arms 23, so that a relatively light force upon the arms 23 at their rear ends tending to spread the arms apart will stretch the springs 27, connected with the curved arm extensions 24, thus permitting separating of the rear ends of the implement arms, as when the rotary finger implements engage some obstruction, such as a rock or the like. The springs 27 will return the arms 23 automatically to their positions shown in full lines in Figure 4.

A pair of rotary self-driving finger cultivator implements 30 are mounted upon the rear end portions of the implement arms 23, as shown in the drawings. Each rotary implement 30 comprises a central disc portion 31 of relatively small diameter, and a multiplicity of circumferentially equidistantly spaced resilient radial wire fingers or tines 32 fixedly secured to the disc portion 30 by welding or other suitable means and projecting radially therefrom. The fingers 32 are preferably formed of round wire which is quite springy, yet stiff enough to perform the desired combing, raking and spreading operation upon the soil and the plants being cultivated. The fingers 32 are of considerable length, as shown, and all fingers of the same implement 30 are of equal length radially so that the multiplicity of fingers defines a circular disc-like implement construction. The extreme end or tip portions of the fingers 32 are preferably bent downwardly for a slight amount, as shown at 33, to facilitate the proper combing and cultivating action upon rotation of the rotary implements.

The two rotary implements 30 of the complete unit shown in Figure 4 are identical, and each implement 30 is freely rotatably journaled upon a short axle or shaft 34, adjustably rigidly secured by nuts 35, or the like, to the rear end portion of one implement arm 23. The disc portion 31 of each rotary implement is rigidly clamped between a pair of nuts 36 and 37, Figure 8, and these nuts have screw-threaded engagement with a screw-threaded bearing 38, journaled for free rotation upon the axle 34 and held thereon by an enlarged head 38' of the axle.

As best shown in Figures 2 and 5, the implement arms 23 are twisted somewhat on their longitudinal axes, so that the rotary implements journaled upon their rear ends are inclined somewhat from the horizontal, and downwardly converging toward each other as shown in Figure 2. The angle of each implement 30 to the horizontal is relatively slight, and merely sufficient to allow the ends of the resilient fingers 32 to engage the ground and roll therealong, during the operation of the cultivator. As clearly indicated in Figure 3, the outer end portions 33 of the fingers 32 interengage in the manner of gear teeth, and the downturned finger portions 33 are also arranged to engage the ground at their region of meshing engagement. Because of this arrangement, when the downturned portions 33 of the fingers engage the soil, the disc-like implements 30 will be turned like any other wheel or disc structure, and the intermeshing of the fingers 32 of the pair of implements 30 will cause the implements to drive each other continuously in the manner of meshing gears. Because of the inclination to the horizontal and inward and downward convergence of the implements 30, the same will always tend to roll toward each other with the rear ends of the arms 23, and the fingers 32 will remain in meshed engagement, as described, when the cultivator is drawn forwardly. As shown in Figure 2, the companion pairs of rotary implements 30 ride close to the tops of the relatively wide plant hills 38, and each companion pair of implements 30 extends for substantially the full width of the adjacent plant hill 38, as shown.

In use, with particular reference to Figures 1 to 3, a plurality of the cultivator units such as that shown by Figure 4 is rigidly secured by the bolt means 12 to the rear horizontal transverse frame bar 13 of the cultivator 39 having the spaced plowshares 40. The cultivator is drawn forwardly by means of a tractor or the like, not shown. The plowshares 40 of the cultivator form the usual parallel furrows 41 in the soil between the plant hills 38. The several cultivator units embodying the present invention are arranged between adjacent pairs of the plowshares 40, Figure 1, and between pairs of the furrows 41 and directly above the plant hills 38, as shown. Peanut vines 42, or the like, are growing in the plant hills 38, and the cultivator units of the present invention coact with the plowshares 40 to properly manipulate the soil about the vines 42 during the cultivating operation.

When the plowshares 40 form the furrows 41, soil is thrown and heaped up onto the plant hills 38, and such soil may sometimes cover and tend to smother out the peanut vines and thereby reduce the yield of the plants, particularly the larger peanuts on the center stalks. As previously mentioned, the trailing cultivator units of the present invention fully alleviate this difficulty, and properly spread and level the soil upon the tops of the plant hills so that only the required amount of soil, such as three-quarters of an inch, is left covering the offshoots of the peanut vines.

The chains 20 are slack during the normal operation of the cultivator, and the rotary implements 30 of each cultivator unit roll along on top of the plant hills 38 in the manner of wheels with the tips 33 of the resilient fingers 32 intermeshing and also engaging in the soil, and also directly contacting the peanut vines 42 or the like. As the cultivator moves forward, the rotary implements 30 of each cultivator unit will turn in unison in the direction of the arrows, Figures 1 and 3. The implements 30 will spread and level the soil laterally outwardly on top of the plant hills 38 with a light brushing action, somewhat in the manner of human hands. The fingers 32 will directly engage the peanut vines and comb the same in a desirable manner, and the fingers will also loosen the soil about the vines and break up any large pieces of soil and also propel lumps and rocks outwardly toward the furrows 41. The general result of this action is that each plant hill 38 is level and smooth on top after treatment by the cultivator units and only the desired amount of loose cultivated soil is left on top of and about the peanut vines or like plants.

During the above-described operation of each cultivator unit, the resilient fingers 32 of the companion pair of rotary implements 30 tend to vibrate constantly, and this vibratory action, and the spacing of the fingers circumferentially aids the same in passing about the stalks of the plants without digging into the stalks. The fact that the fingers 32 are formed of wire which is round in cross section also aids the stalks in passing between or intermeshing with the resilient fingers, and the companion pair of rotary implements passes smoothly along and over the vines or plants in direct contact therewith without injury to the latter.

Whenever any unusual obstruction, such as a large rock is encountered, the implement arms 23 may readily swing apart at their rear ends, due to the arrangement of the pivots 22' and the yieldable springs 27 at the forward ends of the arms. This allows each companion pair of implements 30 to separate and pass around the obstruction, and then return automatically to their normal positions of Figure 4, wherein the resilient wire fingers 32 are in meshing engagement. The precise spacing of the implements 30, Figure 4, and the degree of meshing engagement of the resilient fingers 32 is adjustable through the medium of the screws 26, which bear against the arms 18, as should now be obvious.

When it is necessary for the tractor and cultivator to move rearwardly, while the implements 30 are in the lowered or ground engaging positions, the fingers 32 may tend to dig into the soil and become obstructed upon backward movement of the machine. However, due to the parallelogram linkage afforded by the links 15 and chains 20, Figure 5, this backward movement of the machine will cause the links 15 to swing forwardly, Figure 5, and the chains 20 will also be drawn forwardly diagonally, and become tightened. As soon as this action occurs, the chains 20 will become foreshortened and the arms 18 and 23 will be bodily elevated with the implements 30 so that the same will be lifted from the ground and cannot dig into the ground. This is a completely automatic feature of the invention, which prevents damage to the cultivator units when the tractor is backing up. It should be understood here that the entire cultivator 39, including the cultivator units of the present invention, is raised and lowered in the usual manner by the conventional hydraulic lift means of the tractor, not shown. When the cultivator 39 is lifted from contact with the soil, see Figure 11, the chains 20 will become taut or tightened for lifting the arms 18 and 23 carrying the implements 30 clear of the ground, and the entire cultivator may then be transported on the highway or the like.

It should again be emphasized that the coacting rotary implements 30 of each cultivator unit are much nearer to a horizontal plane than to the vertical during operation, Figure 2, and the implements 30 engage the tops of the plant hills 38 and the vines or plants with a light outward vibratory brushing action. Also, the intermeshing engagement of the fingers 32 shown clearly in Figure 3 aids the same in combing and cultivating the vine 42, and also assures that both rotary implements 30 will be constantly driven in the manner of cogs or gears, when the implements are in rolling contact with the ground.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, I claim:

1. A cultivator for peanut vines in a row comprising an elevated horizontal cultivator frame, a substantially vertical frame depending from said cultivator frame and having its upper end pivoted thereto so that the depending frame may swing vertically beneath the cultivator frame, a substantially horizontal implement mounting frame extending rearwardly of the depending frame and having its forward end pivoted to the lower end of the depending frame and adapted to swing vertically behind the depending frame, a pair of elongated generally parallel spaced substantially horizontal arms pivoted intermediate their ends to the rear end of said mounting frame and being swingable substantially horizontally upon the mounting frame, said arms extending for substantial distances rearwardly of the mounting frame and having forward portions extending for relatively short distances forwardly of the pivots of said arms and adjacent to the mounting frame, springs interconnecting said forward portions of the arms and mounting frame and urging the forward portions apart and thereby urging the rear ends of the arms together, adjusting set screws carried by the forward portions of the arms and engaging the mounting frame to limit the extent of separation of said forward portions under the influence of said springs, depending shafts carried by the rear ends of said arms, and a pair of circular disc-like cultivator implements freely rotatably mounted upon said shafts and including a multiplicity of radial resilient wire fingers having their outer ends spaced apart circumferentially a relatively slight amount, said fingers of each implement lying in the same plane and the planes of the implements disposed at a slight angle to the horizontal and converging inwardly and downwardly, whereby end portions of the radial fingers of the pair of implements constantly overlap and intermesh as the implements engage and roll upon the ground, said fingers adapted to vibrate rapidly and to thereby engage about the stems of the peanut vines without damaging them, said fingers combing the vines and sweeping the soil laterally outwardly from the vines at opposite sides thereof and leveling the hills on which the vines are planted in rows.

2. A cultivator for peanut vines in a row according to claim 1, and means interconnecting said cultivator frame and horizontal mounting frame to limit downward swinging movement of the mounting frame when the cultivator frame is elevated as while transporting the cultivator on a road.

3. A cultivator for peanut vines in a row according to claim 1, rigid substantially horizontal frame means secured to the cultivator frame and extending rearwardly thereof above and generally parallel to said mounting frame, and means interconnecting the rear ends of said frame means and mounting frame to limit downward swinging of the mounting frame and causing elevation of the mounting frame when the depending vertical frame has its lower end swung forwardly when the cultivator is backed up while said fingers are engaging the ground.

4. A cultivator for peanut vines in a row according to claim 1, rigid horizontal frame means secured to the cultivator frame and extending rearwardly thereof above and generally parallel to said mounting frame, and flexible means interconnecting the rear ends of the rigid frame means and said mounting frame to limit downward swinging movement of the mounting frame and causing elevating of the mounting frame when the depending vertical frame has its lower end swung forwardly due to backing up the cultivator while said implements are engaged with the ground.

References Cited in the file of this patent
UNITED STATES PATENTS

| | | |
|---|---|---|
| 1,244,982 | Horst | Oct. 30, 1917 |
| 1,581,404 | Smith | Apr. 20, 1926 |
| 1,610,587 | Randolph et al. | Dec. 14, 1926 |
| 2,196,636 | Longman | Apr. 9, 1940 |
| 2,551,870 | Bridger | May 8, 1951 |